United States Patent [19]

Haneda et al.

[11] Patent Number: 5,719,924
[45] Date of Patent: Feb. 17, 1998

[54] ELECTRONIC INFORMATION TRANSMITTING APPARATUS WITH REVIEWABLE TRANSMISSION HISTORY

[75] Inventors: Isamu Haneda, Kyoto; Hideki Okuno, Tenri; Hiroyuki Kitamori, Yamatokoriyama, all of Japan

[73] Assignee: Sharp Kabushiki Kaisha, Osaka, Japan

[21] Appl. No.: 440,143

[22] Filed: May 12, 1995

[30] Foreign Application Priority Data

May 16, 1994 [JP] Japan .................................. 6-100475

[51] Int. Cl.⁶ .................................................. H04M 11/00
[52] U.S. Cl. ................................ 379/100.03; 358/442
[58] Field of Search ........................... 379/100, 96–98, 379/93.17, 93.19, 93.23, 93.27, 100.01, 100.03; 358/400, 404, 440, 468, 442, 453, 460

[56] References Cited

U.S. PATENT DOCUMENTS

| | | | |
|---|---|---|---|
| 4,907,094 | 3/1990 | Mishima et al. | 358/404 |
| 5,220,438 | 6/1993 | Yamamoto | 358/404 |
| 5,280,366 | 1/1994 | Araki | 358/453 |
| 5,392,131 | 2/1995 | Umeno | 358/440 |
| 5,426,518 | 6/1995 | Ohyanagi | 379/100 |
| 5,455,686 | 10/1995 | Nagano et al. | 358/404 |

FOREIGN PATENT DOCUMENTS 3268562  11/1991  Japan .

Primary Examiner—Wing F. Chan

[57] ABSTRACT

The electronic apparatus of the present invention can easily retrieve data transmitted via a facsimile function of the apparatus. The apparatus includes a data memory for storing input data; a transmission device for facsimile-transmitting the data stored in the data memory; a history information memory for storing history information of the transmission by the transmission device; a listing display for listing the history information stored in the history information memory; a specifying device for specifying desired history information from a history information listed displayed by the listing display; and a retrieval device for retrieving the transmitted data corresponding to the history information specified by the specifying device from the data memory device to a display.

14 Claims, 13 Drawing Sheets

FIG. 4

Cursor — ⬚Segmentation provides · · · · · · · · · · · · · · ·

Bottom line { [Register] [Retrieve] [Delete] [         ] [Create]

FIG. 5

<Registration>

Cursor — [Registration name] ___

(Input registration name and press [ENTER] key)

Bottom line { [         ] [         ] [         ] [         ] [Return]

FIG. 6

<Retrieval>

AAAA
BBBB
CCCC
DDDD
EEEE
FFFF
GGGG

Bottom line { [         ] [         ] [         ] [         ] [Return]

FIG. 7

```
                      <Deletion>
     AAAA
     BBBB
     CCCC
     DDDD
     EEEE
     FFFF
     GGGG Bottom
 line {  [      ] [        ] [       ] [       ] [Return]
```

FIG. 8

```
Cursor ─┐
        ↘

Bottom
 line {  [Register] [Retrieve]  [Delete]   [      ]  [Create]
```

```
              <Input sendee information>

[Company name] _____
[Dept.]        _____
[Position]     _____
[Name]         _____
[TEL]          _____
[FAX]          _____

[        ] [          ] [        ] [        ] [Return]
```

FIG.12

```
              <Sendee information>

[Company name] ABC Co.,Ltd.
[Dept.] Sales planning Dept., 1st planning Sect.
[Position] Section chief
[Name] Taro Yamada
[TEL] 03-9876-5432
[FAX] 03-9876-1098

[Add]      [Edit]     [Delete]    [List]    [Return]
```

FIG.13

```
              <Input sendee information>
[Company name]
[Dept.]
[Position]
[Name]
[TEL]
[FAX]
[Remarks]
[Sender]

[Register] [          ] [          ] [          ] [Return]
```

FIG. 14

<Sendee list>

| | |
|---|---|
| ABC Co. | ○○○○ |
| DEF Trading Co. | ▭▭▭▭ |
| GHI Corp. | △△△△ |
| JKL Inc. | ◇◇◇◇ |
| MNO Co., Ltd. | ☆☆☆☆ |
| PQR Metal Co., Ltd. | ▽▽▽▽ |
| STU Iron Works | $$$$ |
| VWX Developing Co. | ££££ |

[Add]   [Edit]   [Delete]   [Detail]   [Return]

FIG. 15

| Sendee list | |
|---|---|
| ABC Co. | ○○○○ |
| DEF Trading Co. | ▭▭▭▭ |
| GHI Corp. | △△△△ |
| JKL Inc. | ◇◇◇◇ |
| MNO Co., Ltd. | ☆☆☆☆ |
| PQR Metal Co., Ltd. | ▽▽▽▽ |
| STU Iron Works | $$$$ |
| VWX Developing Co. | ££££ |

[With cover letter] [Transmit] [   ] [   ] [Return]

*FIG.17*

| | 61 | 62 | 63 | 65 | 64 |
|---|---|---|---|---|---|

60

| | Transmission history list [35 records] | | | | |
|---|---|---|---|---|---|
| o | 94/02/17 | ABC Co. | oooo | | Next general meeting |
| o | 94/02/15 | DEF Trading Co. | ◻◻◻◻ | | Examination of deali |
| 0 | 94/02/15 | DEF Co. | ◻◻◻◻ | | Examination of deali |
| o | 94/02/14 | GHI Trading Co. | ΔΔΔΔ | | On the technical sur |
| o | 94/02/10 | DEF Co. | ◻◻◻◻ | | Examination of deali |
| o | 94/02/09 | ABC Co. | oooo | | February general mee |
| 2 | 94/02/09 | ABC Co. | oooo | | February general mee |
| [Contents] | [ | ] | [ | ·] [ | ] [Return] |

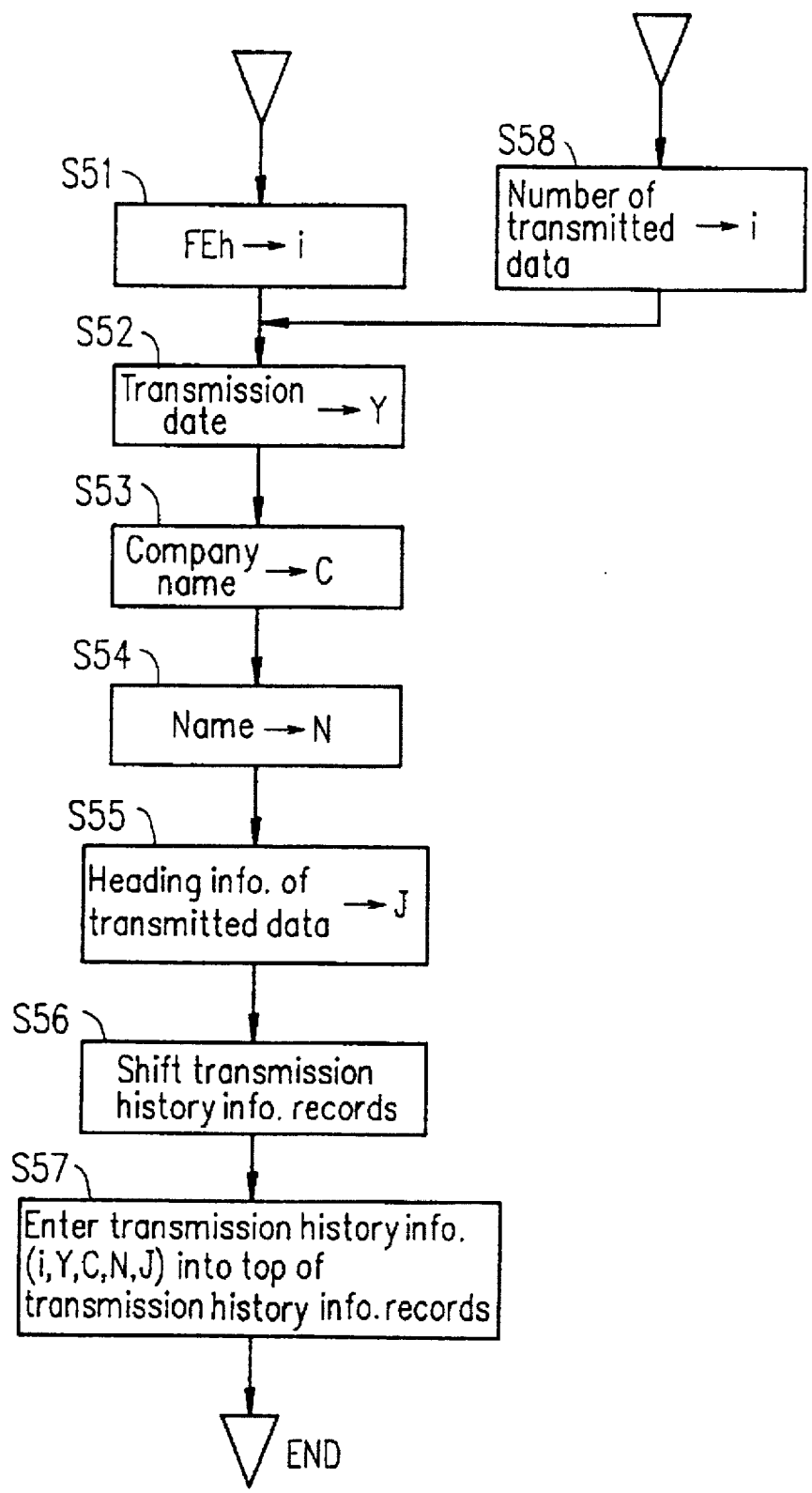

ELECTRONIC INFORMATION TRANSMITTING APPARATUS WITH REVIEWABLE TRANSMISSION HISTORY

BACKGROUND OF THE INVENTION

1. Field of the Invention

The present invention relates to electronic apparatus such as novel portable information tools, electronic notebooks, handheld computers, personal computers, and wordprocessors.

2. Description of the Related Art

Conventional facsimile apparatus or apparatus able to function as a facsimile are provided with additional functions of printing a transmission history list every predetermined period, storing transmission history information, and/or retrieving transmission history information as required. Japanese Laid-Open Patent Publication No. 3-268562 discloses a facsimile apparatus having these functions. However, no conventional facsimile apparatus is provided with a function of directly retrieving the contents of transmitted data from a transmission history list to confirm the transmitted data.

SUMMARY OF THE INVENTION

Conventionally, facsimile apparatus aim at transmitting printed documents. Transmitting information stored in an electronic apparatus such as an information tool (i.e., non-printed documents) via a facsimile function incorporated in the electronic apparatus has been studied. In such an event, it is required to save the contents of transmitted data so that the user can confirm the contents after the transmission. Further, in order to retrieve desired data transmitted via the facsimile function of the electronic apparatus, not just to keep the data in a memory of the electronic apparatus, a means to access the stored data should be provided.

An electronic apparatus of the present invention includes: data memory for storing input data; transmission for facsimile-transmitting the data stored in the data memory; history information memory means for storing history information of the transmission by the transmission; listing display means for listing the history information stored in the history information memory; specifying circuit for specifying desired history information from a history information listed displayed by the listing display; and retrieval for retrieving the transmitted data corresponding to the history information specified by the specifying circuit from the data memory to display means or latch memory for temporary storing the data.

In one embodiment of the invention, the history information memory means stores a result of the transmission, transmission date, sendee, and a portion of the transmitted data as the history information of the transmission.

In another embodiment of the invention, the retrieval means compares the portion of the data to be transmitted of the history information specified by the specifying circuit with the data stored in the data memory, and retrieves data identical to the portion of the transmitted data from the data memory to the display or the latch memory.

Alternatively, an electronic apparatus of the present invention includes: data memory for storing input data; transmission for facsimile-transmitting the data stored in the data memory; history information memory for storing a set of at least a portion of the data and history information of the transmission of the data for every facsimile transmission; display for listing the history information stored in the history information memory in a manner that the newer history information is nearer the top of the list; and selection for selecting desired history information from the listed history information, wherein the display displays at least a portion of the data corresponding to the selected history information.

In one embodiment of the invention, the history information includes a result of the facsimile transmission, a transmission date, and a sendee of the data stored in the data memory.

In another embodiment of the invention, the display displays a predetermined code when the facsimile transmission is successful, while it displays the amount of data transmitted to a sendee when the facsimile transmission is not successful.

In another embodiment of the invention, the display displays a result of the facsimile transmission, a transmission date, and a sendee corresponding to the data stored in the data memory in a row.

In another embodiment of the invention, the selection includes an upward key and a downward key for selecting the desired history information from the history information listed on the display.

In another embodiment of the invention, the display highlights the selected history information.

Thus, according to the present invention, desired transmitted data can be retrieved by specifying corresponding history information from a history information list including the result of the transmission, the transmission date, the sendee, and a portion of transmitted data.

Further, according to the present invention, the portion of the transmitted data included in the history information specified by the specifying means is compared with the data stored in the data memory means, and any data corresponding to the portion of the transmitted data is retrieved from the data memory means to a display.

According to the present invention, desired transmitted data can be retrieved by specifying corresponding history information from a history information list displayed on a display of the electronic apparatus.

Also, according to the present invention, the result of the transmission, the transmission date, the sendee, and a portion of transmitted data can be stored as the history information.

Further, according to the present invention, the portion of the transmitted data included in the history information specified by the specifying means is compared with the data stored in the data memory means, and any data corresponding to the portion of the transmitted data is retrieved from the data memory means.

With the above functions, the transmitted data can be retrieved by the simple operation of specifying desired history information from a history information lists, so as to confirm the contents of the transmitted data. This improves the operability of the electronic apparatus.

Also, in the electronic apparatus of the present invention, only a portion of the transmitted data is stored as the history information. Accordingly, the number of transmitted data which can be stored in the memory increases compared with an apparatus where the entire transmitted data are stored in the memory.

Further, since the transmitted data is retrieved from the data memory means by use of a portion of the transmitted data, there is no need of newly inputting information for specifying each data to the electronic apparatus.

Thus, the invention described herein makes possible the advantages of (1) providing an electronic apparatus capable of retrieving transmitted data by a simple operation of specifying desired history information from a history information list, to confirm the contents of the transmitted data, thereby improving the operability, and (2) providing an electronic apparatus capable of storing an increased number of transmitted data at a time.

These and other advantages of the present invention will become apparent to those skilled in the art upon reading and understanding the following detailed description with reference to the accompanying figures.

BRIEF DESCRIPTION OF THE DRAWINGS

FIG. 4 illustrates an example of a data display screen according to the present invention.

FIG. 5 illustrates an example of a registration screen according to the present invention.

FIG. 6 illustrates an example of a retrieval screen according to the present invention.

FIG. 7 illustrates an example of a deletion screen according to the present invention.

FIG. 8 illustrates an example of a creation screen according to the present invention.

FIG. 12 illustrates an example of a sendee information display screen according to the present invention.

FIG. 13 illustrates an example of a sendee page input screen according to the present invention.

FIG. 14 illustrates an example of a sendee list display screen according to the present invention.

FIG. 15 illustrates an example of a sendee list display screen appearing when a [FAX] key is pressed.

FIG. 17 illustrates an example of a transmission history list display screen according to the present invention.

FIG. 20 is a flowchart illustrating a process of registering information in the transmission history memory region according to the present invention.

DESCRIPTION OF THE PREFERRED EMBODIMENTS

Figure 1:
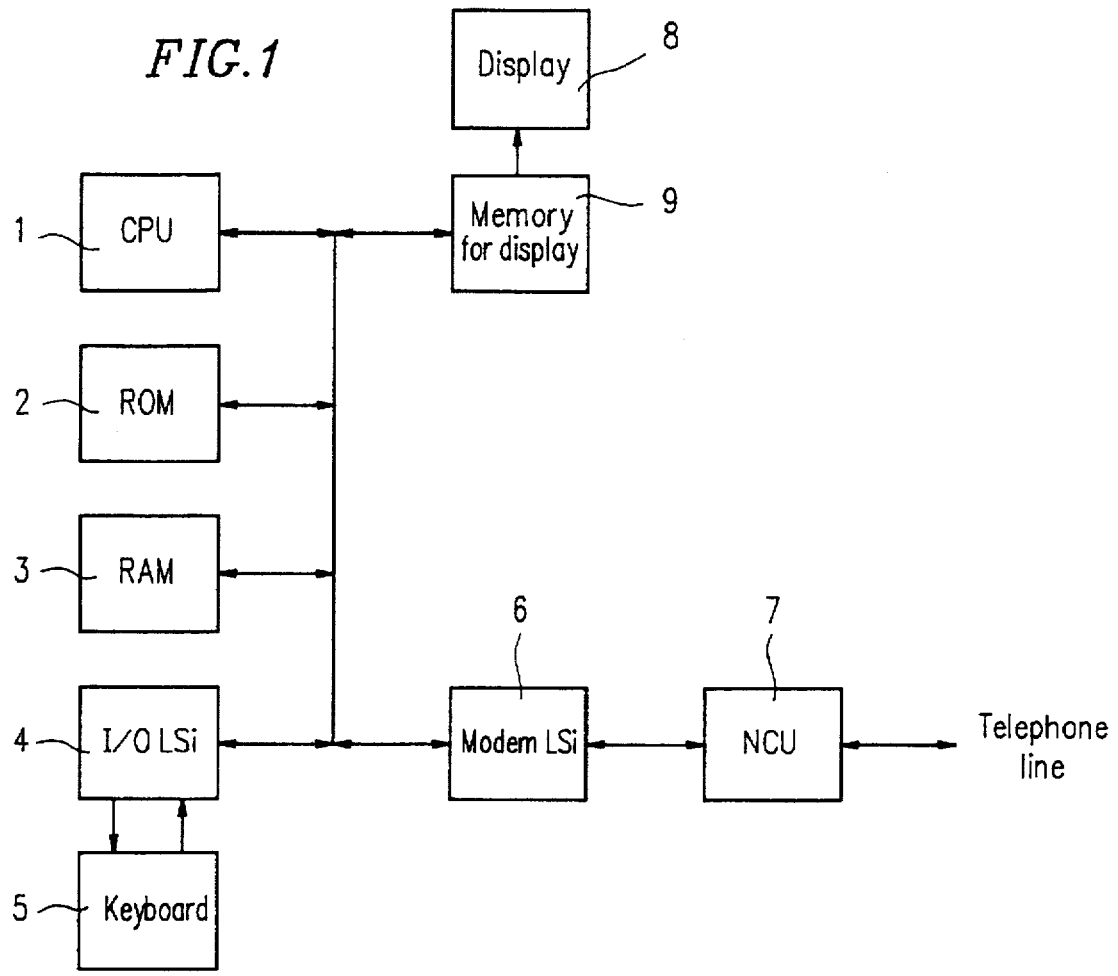
FIG. 1 is a system block diagram of an electronic apparatus of the present invention.

Referring to FIG. 1, an example of the electronic apparatus according to the present invention will be described in detail.

A CPU (central processing unit) 1 executes processings including input and retrieval of data, registration of sendee information, and facsimile transmission. A ROM (read only memory) 2 stores execution programs for operating the electronic apparatus of the present invention. The CPU 1 executes the above processings in accordance with programs stored in the ROM 2. A RAM (random access memory) 3 includes a work region required for the CPU 1 to execute various types of processings. The RAM 3 also includes a region for storing sendee information to which input data is to be transmitted, a region for storing transmission history information, and the like. An I/O LSi 4 controls an I/O apparatus. A keyboard 5 is used to input data into the electronic apparatus of the present invention. The CPU 1 is provided with information as to which key of the keyboard is being pressed by the user through the I/O LSi 4. A modem (modulator) LSi 6 for facsimile transmission modulates data to be transmitted. The modulated data is carried on a telephone line through an NCU (network control unit) 7. When the MODEM LSi 6 receives dialing information from the CPU 1 or the keyboard 5, it automatically starts dialing. The NCU 7 is a circuit required for the connection with the telephone line. When data is to be transmitted, the NCU 7 connects with the telephone line and supplies the dialing information to the telephone line. When the telephone line is connected with the sendee, data to be transmitted is supplied to the telephone line through the MODEM LSi 6 and the NCU 7 so as to be received by the sendee. A display 8 displays, for example, a screen shown in FIG. 13 which will be described later. The display 8 may be a liquid crystal display. A memory 9 for display temporarily stores the data to be written on the display 8.

Figure 2:
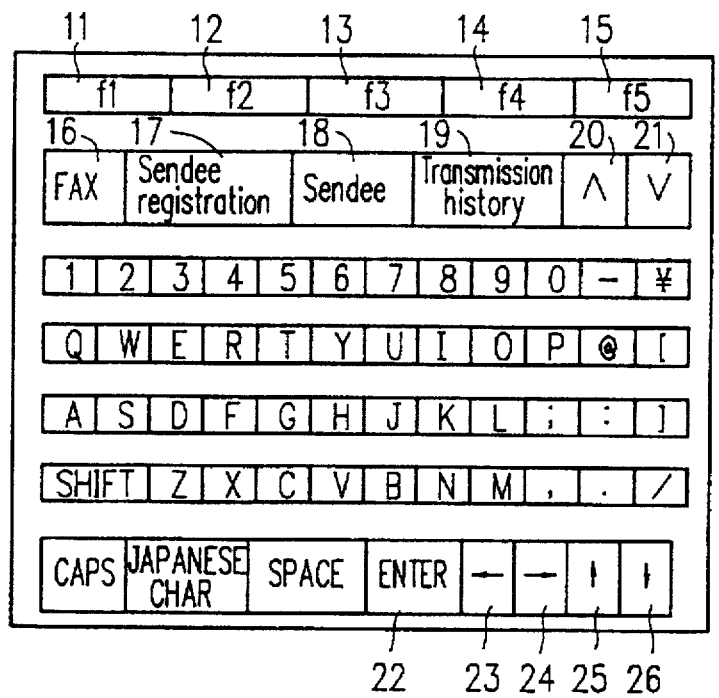
FIG. 2 illustrates an example of a keyboard according to the present invention.

FIG. 2 is an example of the keyboard 5, which has function keys ([f1] to [f5]) 11 to 15. These keys 11 to 15 correspond to five functions displayed on the bottom line of screens as shown in FIGS. 4 to 8 of which details will be described later. The keyboard 5 also includes, in addition to ordinary keys for inputting characters, figures, codes, and the like, a [FAX] key 16 for specifying the facsimile transmission, a [sendee registration] key 17 for registering sendee information, a [sendee] key 18 for preparing a sendee page, a [transmission history] key 19 for displaying a transmission history list, retrieve keys ([∧], [∨]) 20 and 21 for retrieving data, an [ENTER] key 22 for executing a processing, cursor keys ([←], [→], [↑], [↓]) 23 to 26 for moving the cursor leftward, rightward, upward, and downward, respectively.

Figure 3:
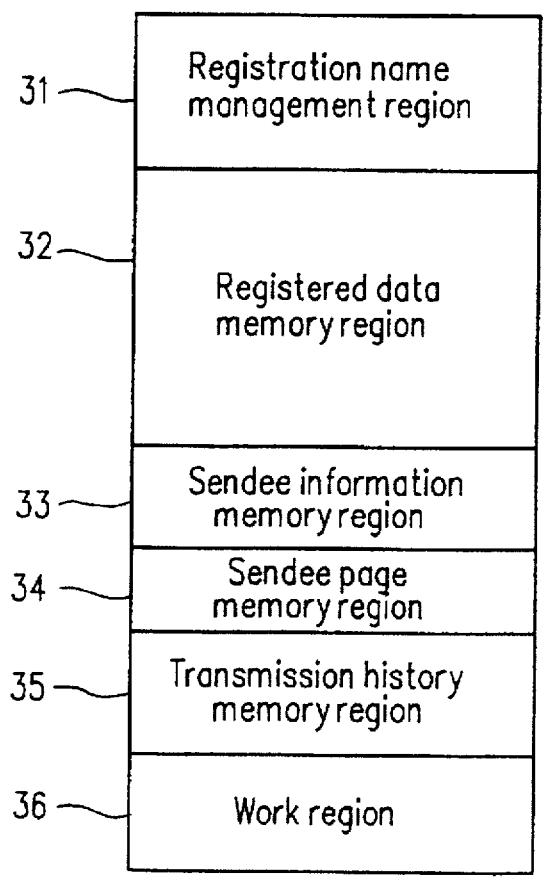
FIG. 3 illustrates memory regions of a RAM according to the present invention.

FIG. 3 shows memory regions of the RAM 3. The memory regions include, for example, a registration name management region 31, a registered data memory region 32, a sendee information memory region 33, a sendee page memory region 34, a transmission history memory region 35, and a work region 36, in this order from the top. These memory regions store corresponding input data. The sendee information memory region 33 stores sendee information for managing the sendee information. Each sendee information includes the company name, department, position, name (person in charge), etc. as shown in FIG. 13.

The sendee page memory region 34 stores information for preparing a cover letter to be transmitted at the facsimile transmission. This information includes a text of the cover letter, a cover letter display format, and the like, in addition to the company name, department, position, and name.

FIG. 4 shows an example of data displayed on a screen of the display 8. Data stored in the registered data memory region 32 of the RAM 3 is displayed on the display 8 via the memory 9 for display. When data is retrieved on the display 8, the cursor is initially positioned at an upper left corner. Data newly input via the keyboard 5 is sequentially stored in the work region 36 and simultaneously displayed on the display 8.

The functions displayed on the bottom line of the screen shown in FIG. 4, [register], [retrieve], [delete], [ ], [create] correspond to the [f1] to [f5] function keys 11 to 15, respectively. By pressing these function keys, the corresponding functions displayed on the bottom line of the screen are executed. The vacant display [ ] shows that the [f4] key is not defined in this case.

The function of registering the data displayed on the screen of FIG. 4 will be described.

When the [f1] ([register]) key 11 is selected, a registration screen shown in FIG. 5 appears. FIG. 5 shows one example of the registration screen. When the user inputs a registration name composed of a character string and presses the [ENTER] key 22, the data on the screen is registered under the registration name just input by the user.

The function of retrieving data stored in the RAM 3 will be described with reference to FIG. 6.

When the [f2] ([retrieve]) key 12 is selected from the screen shown in FIG. 4, for example, a retrieval screen shown in FIG. 6 appears. This screen displays a list of registration names, AAAA, BBBB, CCCC, and the like, representing respective registered data. When a number of registered data are stored, any registration name which is not on the present screen can be displayed by moving the cursor upward or downward using the [↑] key 25 and the [↓] key 26. In the initial screen which appears immediately after the [retrieve] function is selected, the registration name on the top of the list is highlighted. By moving the cursor using the [↑] key 25 and the [↓] key 26, any desired registration name can be highlighted. By pressing the [ENTER] key 22, data corresponding to the highlighted registration name is displayed on the screen. More specifically, the desired data is retrieved into the work region 36 and then displayed on the screen starting from the portion of data located on the top of the work region 36 as shown in FIG. 4. The cursor is initially positioned at the upper left corner of the screen, as mentioned above.

The function of deleting data stored in the RAM 3 will be described with reference to FIG. 7. When the [f3] key 13 for the [delete] function on the screen shown in FIG. 4, for example, is pressed, a deletion screen shown in FIG. 7, which is similar to the retrieval screen of FIG. 6 is displayed. The operation for deleting registered data is the same as the [retrieve] operation described above. By moving the cursor using the [↑] key 25 and the [↓] key 26, the user selects a registration name desired to be deleted. The selected registration name is highlighted. When the user presses the [ENTER] key 22, the registered data is then deleted from the RAM 3. The registration name of the deleted data is also deleted from the list displayed on the [delete] screen. The [delete] screen is still displayed after the deletion. When the user wishes to terminate the [delete] operation, the [f5] ([return]) key 15 should be pressed. Then, the previous screen before the [delete] screen is displayed.

The operation of creating new data by use of the apparatus of the present invention will be described with reference to FIG. 8. When the [f5] key 15 for the [create] function shown in FIG. 4, for example, is pressed, a new data input screen shown in FIG. 8 is displayed. At the same time, the work region 36 is cleared, deleting all data if stored in the region. Then, the user can input data by use of the keyboard 5 and the like.

Figure 9:
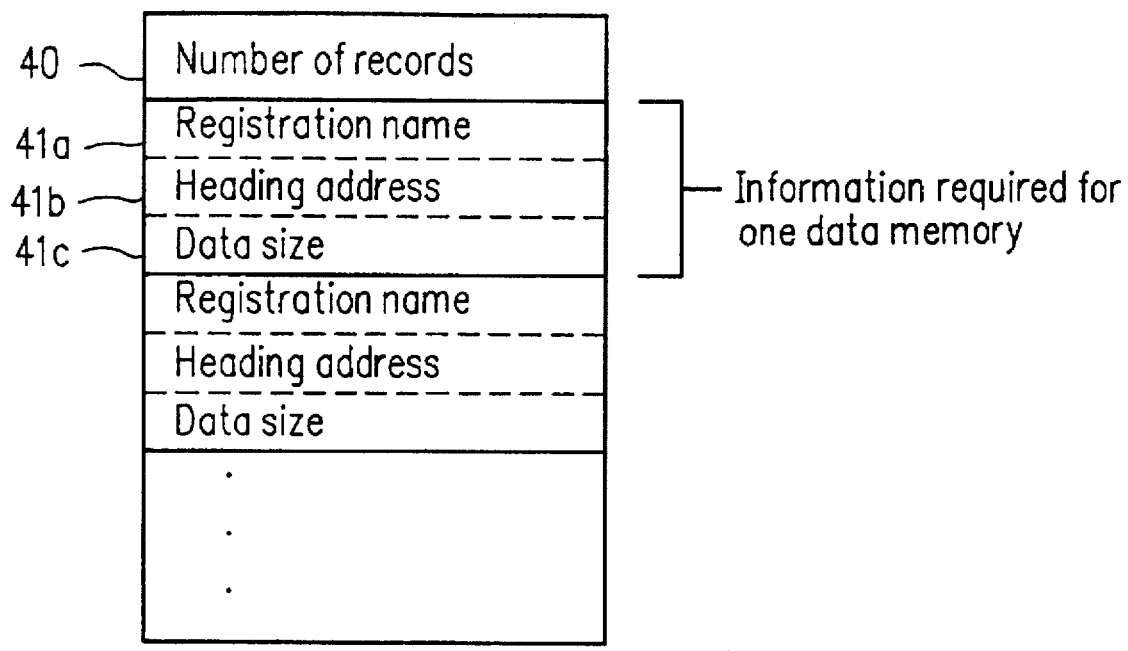
FIG. 9 illustrates a registration name management region of the RAM according to the present invention.

FIG. 9 shows the details of the registration name management region 31. On top of the registration name management region 31 is stored the "number of records" 40 indicating the number of input data (to be described later) stored in the RAM 3. This is followed by a "registration name" 41a, a "heading address" 41b, and a "data size" 41c in this order for each record. The "heading address" 41b stores a top address of registered data 51 (see FIG. 10) in the registered data memory region 32. The "data size" stores a size of the registered data 51.

Figures 10, 11:
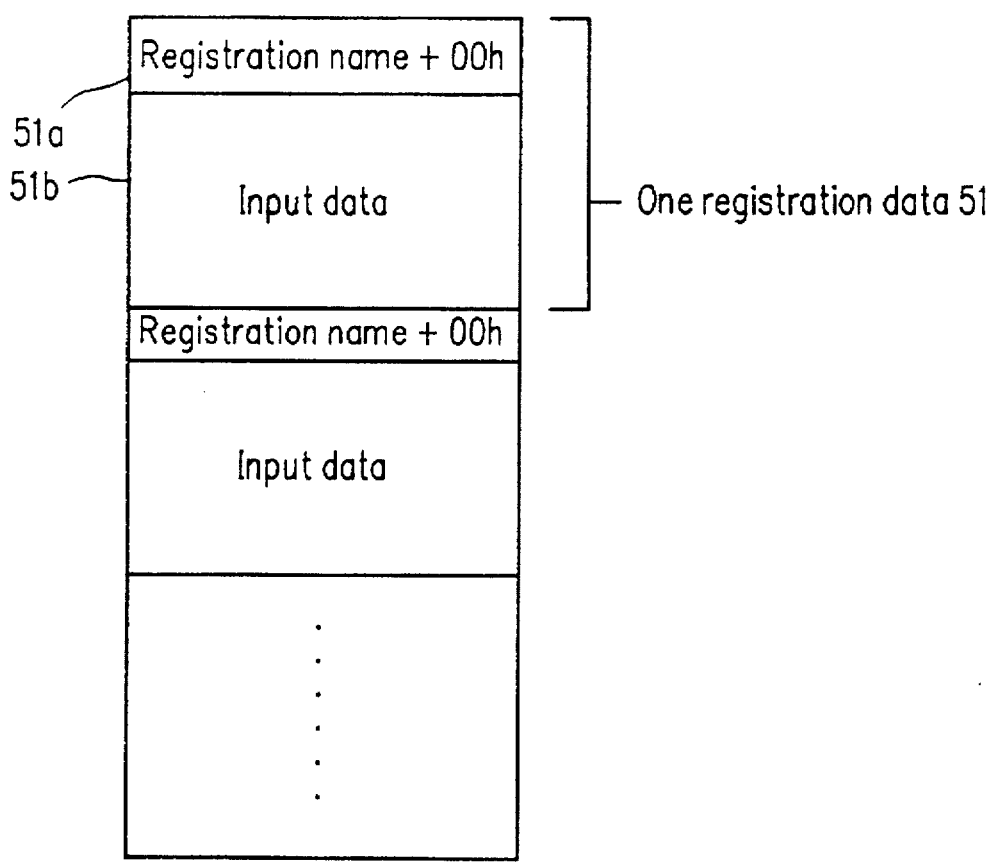
FIG. 10 illustrates an example of storing data in a registered data memory region of the RAM according to the present invention.
FIG. 11 illustrates an example of a sendee information input screen according to the present invention.

FIG. 10 shows the details of the registered data memory region 32. The "registration name+00h" 51a and the "input data" 51b are stored for each record.

When data is retrieved according to the above-described retrieval operation, the "registration name" 41a corresponding to the registration name of the data to be retrieved is called from the registration name management region 31, together with the accompanying "heading address" 41b and the "data size" 41c. Thus, data stored in the registration data memory region 32 having a data size corresponding to the "data size" 41c is retrieved from an address corresponding to the "heading address" 41b as the desired data 51 corresponding to the selected registration name.

When data is deleted according to the above deletion operation, the "registration name" 41a corresponding to the registration name of the data to be deleted is called from the registration name management region 31, together with the accompanying "heading address" 41b and the "data size" 41c as in the case of the above retrieval operation. Based on the "heading address" 41b and the "data size" 41c, the data to be deleted corresponding to the "registration name" 41a stored in the registration data memory region 32 having a data size corresponding to the "data size" 41c is deleted from an address corresponding to the "heading address" 41b. The corresponding "registration name" 41a, the "heading address" 41b, and the "data size" 41c in the registration name management region 31 are also deleted.

When data is registered according to the above registration operation, the newly input registration name is placed at a position preceding all of the already stored registration names in the registration name management region 31, while the newly input data is placed at a position succeeding all of the already stored data in the registered data memory region 32. When the registration of a new registration name or new data is not possible, the screen displays a warning of "memory capacity is not sufficient". In such a case, the screen before the registration operation is resumed without the registration of the new registration name or data. The input, registration, retrieval and deletion of data are thus realized.

Next, the input of information on a sendee to which data is to be facsimile-transmitted will be described. By pressing the [sendee registration] key 17, a sendee information input screen as shown in FIG. 11 appears. The sendee information includes the company name, department, position, name, telephone number, FAX number, and the like, which are filled by the user by use of the keyboard 5. All of the above items are not required to be filled, but only the entries of the name and the FAX number are requisite, because the registration is not possible without these entries. After filling the items including the requisite items, the user presses the [ENTER] key 22 with the cursor positioned on the item of FAX number. Upon completion of the registration of the sendee information by pressing the [ENTER] key 22, the registered information is displayed as shown in FIG. 12. Other sendee information records registered before and after the present sendee information can be displayed on the screen by pressing the [∧] key 20 and the [∨] key 21. Any sendee information may be deleted by pressing the [f3] ([delete]) key 13. By pressing the [f4] ([list]) key 14, the sendee information screen is changed to a sendee list display screen shown in FIG. 14. This function may be applied to a telephone book and a card management function for hand-held computers.

The screen of FIG. 13 is displayed when the [sendee] key 18 on the keyboard 5 is pressed and a corresponding sendee page is not yet registered. The user creates and registers a sendee page using this screen. When the corresponding sendee page has already been registered, the contents thereof are displayed and the user can edit the contents on the screen. The sendee page includes items of company name, department, position, name, telephone number, FAX number, remarks, sender information (company name, department, name, FAX number, and the like). The user fills these items on the screen. The remarks item may include a set phrase. Upon completion of filling required information, the user presses the [f1] ([register]) key 11. Then, the newly input sendee page is displayed on the screen.

FIG. 14 is the sendee list screen displayed when the [sendee registration] key 17 is pressed at the screen of FIG. 2, for example. This list includes a "company name" column 100 and a "name" column 101. By pressing the [f1] ([add]) key 11, the user can add a new sendee information on the screen of FIG. 11. The user can edit the contents of the sendee information in the list in the following manner: A desired set of company 100 and name 101 in the sendee list is selected by moving the upward and downward cursor keys 25 and 26, and the [f2] ([edit]) key 12 is pressed to display the screen of FIG. 11. Then, the sendee information displayed on this screen can be edited as described earlier. When the editing is completed and the [f5] ([return]) key 15 is pressed, the screen displayed before the pressing of the [sendee registration] key 17 is resumed.

When the [f3] ([delete]) key 13 is pressed at the sendee list screen, the sendee information corresponding to the set of highlighted company 100 and name 101 in the sendee list selected by moving the upward and downward cursor keys 25 and 26 is deleted. When the [f4] ([detail]) key 14 is pressed, the sendee information as shown in FIG. 12 corresponding to the highlighted set of company 100 and name 101 in the sendee list is displayed.

The procedure of facsimile-transmitting data will now be described.

First, input or registered data to be transmitted is retrieved. By pressing the [FAX] key 16, the sendee list is displayed on the right of the screen as shown in FIG. 15. The user selects a desired sendee by moving the upward and downward cursor keys 25 and 26 to highlight the selected sendee. When the user presses the [f1] ([with cover letter]) key 11, a corresponding already registered sendee page is first transmitted to the sendee as a cover letter before the transmission of the data to be transmitted. When the user presses the [f2] ([transmit]) key 12, the facsimile transmission without a cover letter is performed.

In either case, at the facsimile transmission, the electronic apparatus of the present invention calls the FAX number included in the sendee information selected by the user and dials the number. When the [f1] ([with cover letter]) key 11 is pressed, some of the items, company name, department, name, FAX number, and the like in the sendee page may be left unfilled. If the same item in the corresponding sendee information record is filled with information record, the unfilled item in the sendee page is filled with the information in the sendee information before the cover letter is transmitted.

Figure 16:
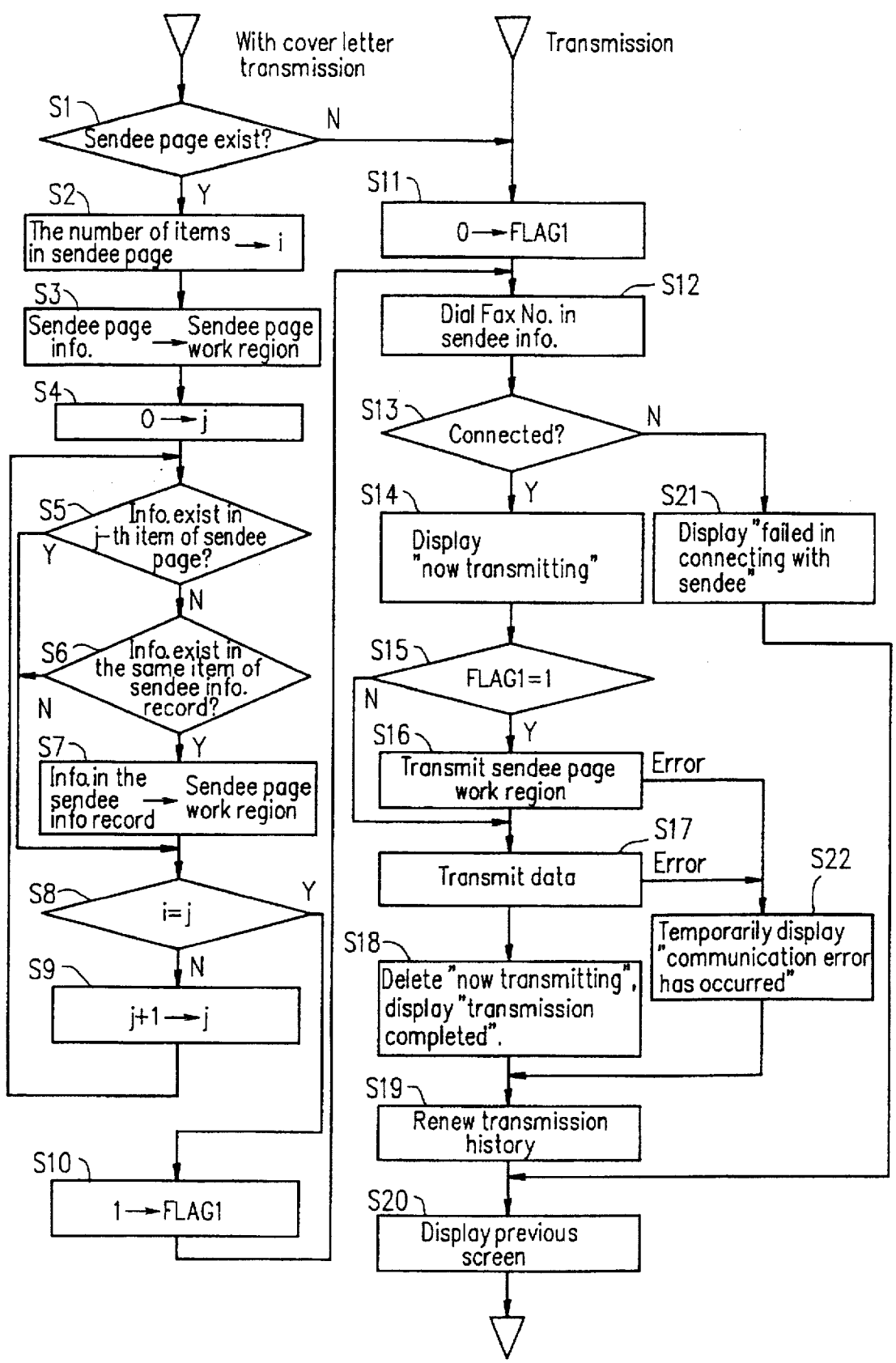
FIG. 16 is a flowchart illustrating a transmission process according to the present invention.

The process of data transmission by the electronic apparatus of the present invention will be described with reference to the flowchart of FIG. 16.

First, the process when the [with cover letter] function is selected will be described.

In step S1, the CPU 1 determines whether or not a corresponding sendee page has been registered. If not registered (NO), the process goes to step S13 to prepare for the transmission without attaching a cover letter.

In step S2, the CPU 1 enters the number of items in the sendee page into a variable i.

In step S3, the CPU 1 copies the information of the sendee page to a sendee page work region (not shown).

In step S4, the CPU 1 initializes a pointer j to "0".

In step S5, the CPU 1 determines whether or not information exists in an item of the sendee page corresponding to the pointer j. In this case, j=1 corresponds to the first item of the sendee page, j=2 corresponds to the second item of the sendee page, and the like. More specifically, in the case of the sendee page shown in FIG. 13, j=1 represents the "company name", j=2 represents the "department", and the like. When information exists in the corresponding item (YES), the process goes to step S8.

In step S6, the CPU 1 determines whether or not the item of the selected sendee information corresponding to the pointer j has its information already registered. If not (NO), the process goes to step S8.

In Step S7, when the corresponding item has information already registered (YES), the CPU 1 copies the information of the item to the sendee page work region.

In step S8, the CPU 1 compares i with j to determine whether or not the steps S6 and S7 have been executed for all the items of the sendee page. When i is identical to j (YES), the process goes to step S10.

In step S9, the CPU 1 increments j and the process returns to step S5 to examine the next item of the sendee page. By repeating the steps S5 through S9, the contents of the sendee page are renewed.

In step S10, the CPU 1 enters "1" into a flag (FLAG1), and the process goes to step S12. This flag indicates whether or not a heading page exists. The value "1" of the flag (FLAG1) means that a heading page exists.

In step S11, the CPU 1 enters "0" into the flag (FLAG1) indicating that a heading page does not exist. "0" is entered into the flag (FLAG1) when the user presses the [transmit] key as shown in FIG. 15.

In step S12, the CPU 1 retrieves a FAX number from the sendee information selected by the user and instructs the NCU 7 to dial the retrieved FAX number.

In step S13, the CPU 1 examines whether or not the NCU 7 has contacted with a sendee's apparatus such as a facsimile apparatus. If the contact with the sendee's apparatus is not established after a predetermined period of time (NO), the CPU 1 instructs the NCU 7 to disconnect the line, and the process goes to step S21.

In step S14, the display 8 displays "now transmitting" on the screen.

In step S15, the CPU 1 checks the flag (FLAG1). When FLAG1 is "0" (NO), indicating that no heading page exists (this is the case where the [transmit] function is selected), the process goes to step S17. When FLAG1 is "1" (YES), indicating that a heading page exists (this is the case where the [with cover letter] function is selected), the process goes to step S16.

In step S16, the heading page is transmitted. If the sendee's facsimile apparatus does not correctly receive the transmitted heading page, the CPU 1 instructs the NCU 7 to discontinue the line, and the process goes to step S22. When the sendee's facsimile apparatus does not correctly receive the transmitted data as described above, i.e., when a transmission error occurs, the MODEM LSi 6 detects the communication error in accordance with a facsimile communication protocol. Any trouble such as transmission interrupt and the like caused on the part of the electronic apparatus of this example is detected by the CPU 1 and is also treated as transmission errors.

In step S17, the data is transmitted. If the above-described transmission error occurs during the transmission of the data, the CPU 1 instructs the NCU 7 to discontinue the line, and the process goes to step S22.

In step S18, the display 8 stops displaying "now transmitting" on the screen, and instead displays "transmission completed" on the screen temporarily (for several seconds).

In step S19, the CPU i confirms that the transmission has been completed (the transmission has been normally completed, or a transmission error has occurred), and then registers the transmission results into the transmission history, which includes success/error, the number of pages transmitted in the case of error, transmission date, sendee (company and/or name), and data transmitted. The details of the transmission history will be described later.

In step S20, the CPU 1 instructs the display 8 to return to the screen before the data transmission.

In step 821, in the case where the sendee's facsimile apparatus does not respond to the dialing by the NCU 7, the CPU 1 instructs the display 8 to display "failed in connecting with sendee" on the screen temporarily.

In step S22, in the case where an error occurs during the transmission, the CPU 1 instructs the display 8 to discontinue the display of "now transmitting" on the screen, and to temporarily display "communication error has occurred". Then, the process goes to step S19.

Now, the transmission history will be described.

FIG. 17 shows an example of the transmission history list display screen appearing when the [transmission history] key 19 is pressed. Referring to FIG. 17, an item 60 represents whether the transmission was successful or an error has occurred. The broad symbol "0" indicates that the facsimile transmission was successful, while figures indicate the number of pages actually transmitted to the sendee except for the heading page. For example, zero "0" indicates that no sheet was transmitted, and "2" indicates that two pages were transmitted. An item 61 represents the transmission date (year/month/day), an item 62 represents the company name or school name of the sendee, an item 63 represents the name of the sendee, and an item 64 represents a portion of heading information of the data transmitted (in the case of FIG. 10, the registration name is entered in the item 64). An item 65 represents the number of records included in the transmission history. In the case of FIG. 17, the number of records is 35. When no record exists in the transmission history, nothing is displayed when the [transmission history] key 19 is pressed. The newest information is placed on the top of the list, while the oldest information is placed on the bottom of the list. When the range for storing the transmission history information is filled with records, and a new record is to be added to the list, the oldest record in the transmission history list is deleted to provide a space for the new record. Also, when a lot of records exceeding the number of records which can be displayed on one screen are included in the transmission history list as in the case of FIG. 17, any record not on the present screen can be displayed by scrolling the list using the upward and downward cursor keys 25 and 26. When the transmission history list first appears on the screen by the pressing of the [transmission history] key 19, the record on the top of the screen is initially highlighted. The highlight can be changed by moving the upward and downward cursor keys 25 and 26.

Then, the operation of retrieving data using the heading portion of the transmitted data will be described. When the [f1] ([contents]) key 11 is pressed at the screen of FIG. 17, the retrieval based on the selected transmission history is conducted. The selection of the transmission history is conducted by highlighting the record (the items 61 to 64) by moving the upward and downward cursor keys 25 and 26 on the above screen. In this retrieval, data of which heading portion is identical to the heading portion provided in the selected transmission history information is retrieved from the registered data memory region 32. Upon completion of the retrieval, the display 8 displays the retrieved data on the screen, which can be edited by the user.

Figure 18:
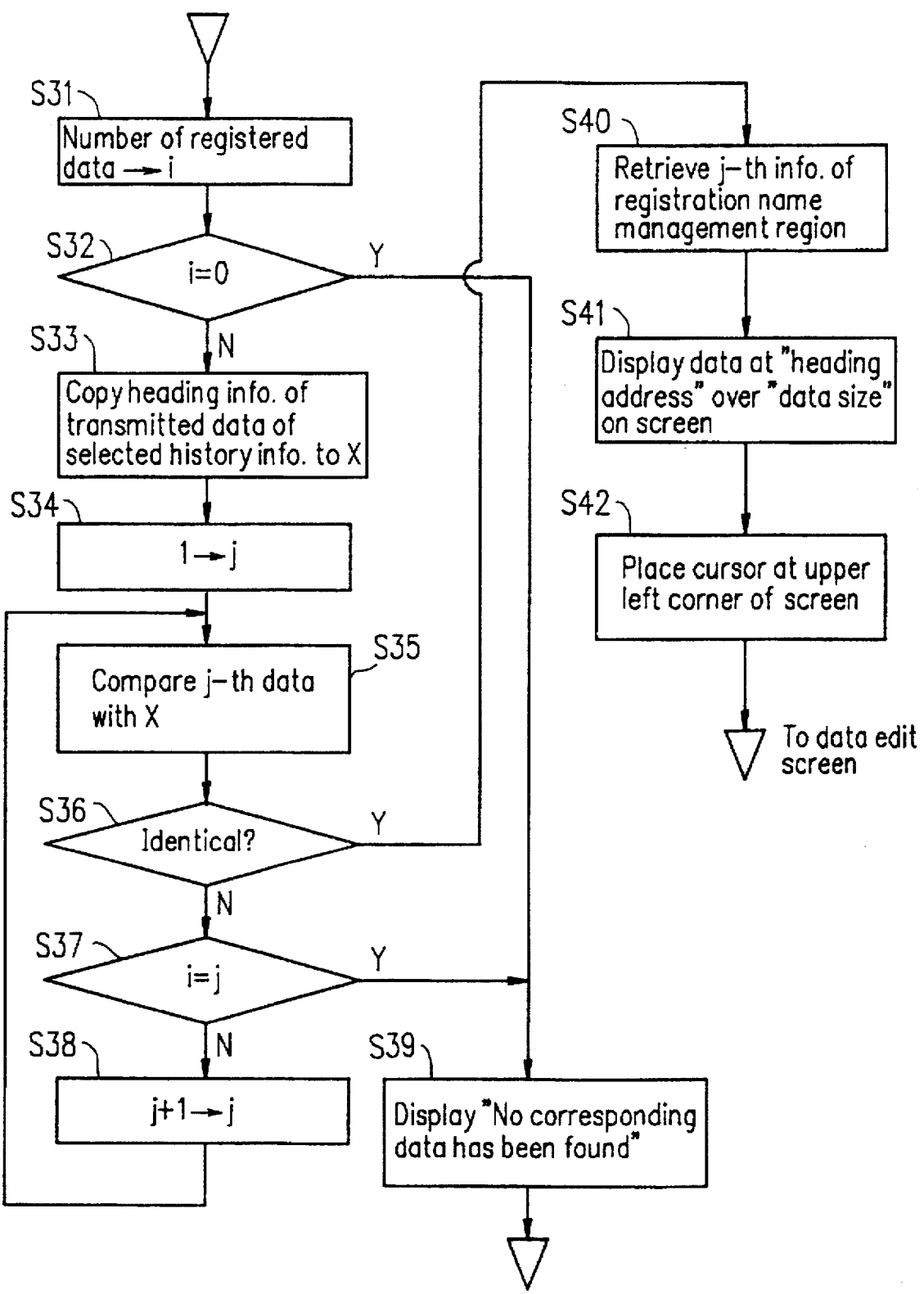
FIG. 18 is a flowchart illustrating a process of retrieving data from the transmission history according to the present invention.

The above data retrieval process will be described with reference to the flowchart of FIG. 18.

The user selects a given record of the transmission history information from the transmission history list display screen to highlight the record (items 61 to 64), presses the [f1] ([contents]) key 11, and goes to step 31.

In step S31, the number of records input and registered by the user (the "number of records" 40 in the registration name management region 31) is entered into a variable i.

In step S32, the CPU 1 examines whether or not the variable i is "0". When the variable i is "0" (YES), no record is registered. The process goes to step S39 which will be described later.

In step S33, the CPU 1 copies the heading portion of the transmitted data of the selected transmission history information to a variable X which is capable of storing character string data.

In step S34, the CPU 1 initialize a counter j to 1.

In step S35, the j-th data stored in the registered data memory region 32 is compared with the variable X. When j is 1, the top data in the registered data memory region 32 is compared with the variable X. Since the registration name has been stored on the top of each registered data in the registered data memory region as shown in FIG. 10, the registration name is compared with the variable X in this case.

In step S36, when the j-th data is not identical to the variable X, the process goes to step 37. When the former is identical to the latter, the j-th data is determined to be the data to be retrieved, and steps S40 through S42 are executed.

In step S40, the data is stored in the memory 9 for display and then displayed on the display 8. When the data is displayed on the display 8, the screen changes to an input/edit screen. This retrieval and subsequent operations are the same as those when the data is selected and the [retrieve] function is selected as described earlier.

Specifically, in step S41, data corresponding to the "registration name" 41$a$ stored in the j-th portion of the registered data memory region 32 having a data size corresponding to the "data size" 41$c$ from an address corresponding to the "heading address" 41$b$ on the screen (the work region 36).

In step S42, the cursor is initially placed at the upper left corner on the screen of the display 8.

In step S37, before the (j+1)th data is compared, whether or not all the registered data were compared with the variable X is determined. When i is equal to j, meaning that all the data have been compared and that no corresponding data has been found, the process goes to step S39.

In step S38, the CPU 1 increments the counter j, and the process returns to step 835 for the comparison of the next data with the variable X.

In step S39, the display 8 displays "no corresponding data has been found" on the screen, and then the process returns to the previous screen displayed before the pressing of the [f1] ([contents]) key 11.

When the [f5] ([return]) key 15 is pressed, the process returns to the previous screen displayed before the pressing of the [transmission history] key 19.

Figure 19:
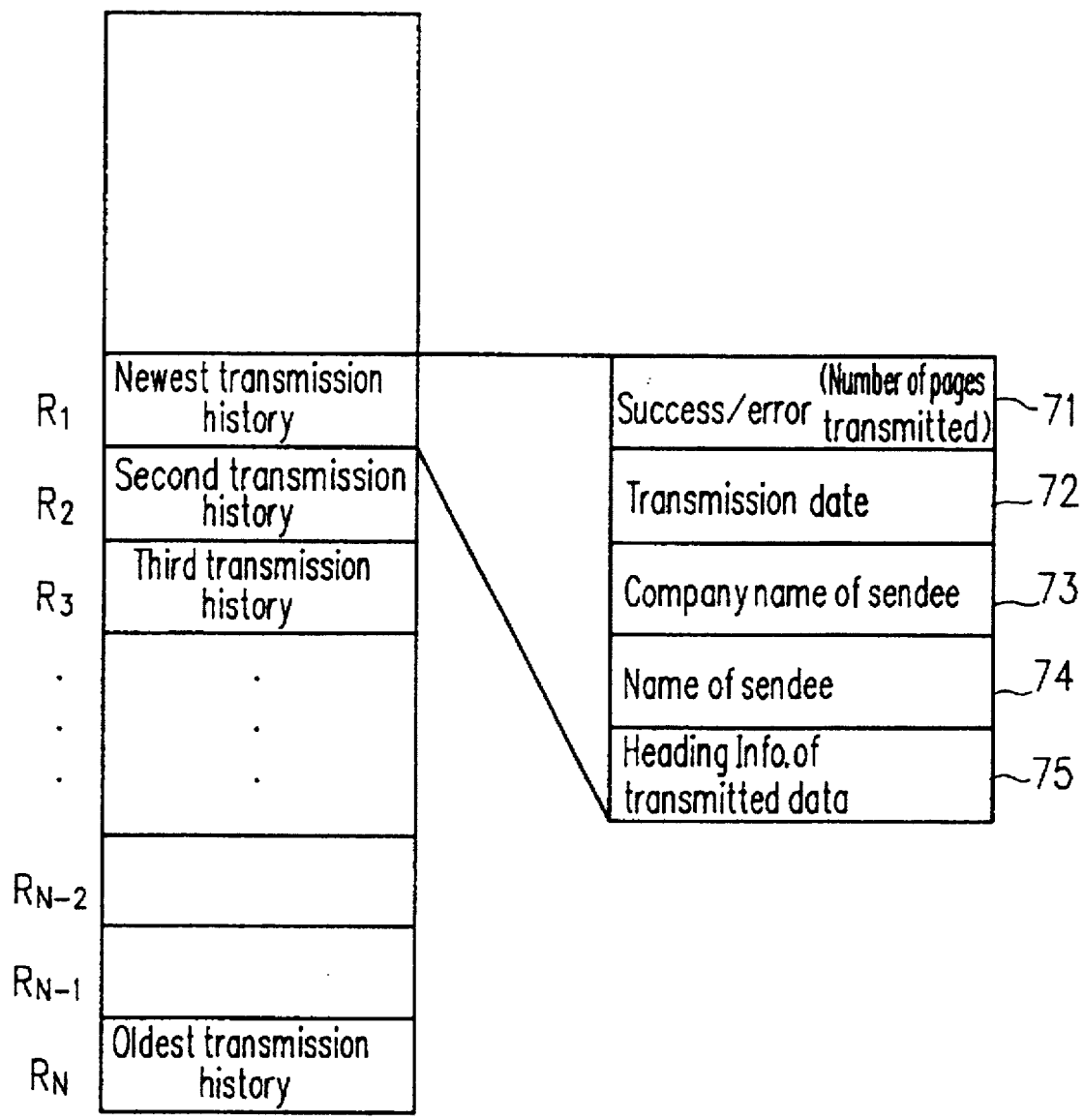
FIG. 19 illustrates an example of storing information in a transmission history memory region of the RAM according to the present invention.

FIG. 19 shows an example of the arrangement of the transmission history information records stored in the transmission history memory region 35 of the RAM 3. The newest transmission history information is stored on the top of the region, while the oldest transmission history information is stored on the bottom of the region. When the region is filled with the transmission history information records, and a new record is to be stored in the region, the oldest transmission history information record is deleted so as to register the new one on the RAM. Each transmission history information record includes items of "success/error (Number of pages transmitted)" 71, "transmission date" 72, "company name of the sendee" 73, "name of the sendee" 74, and "heading portion of data" 75. All the contents of the transmission history information are not displayed on the display 8. When any of the contents of these items exceeds the number of bits allocated for each of the items (61 to 64) on the display screen as shown in FIG. 17, the portion of the contents of the item exceeding the allocated bits is omitted.

Next, the process of registering the transmission history information will be described with reference to FIG. 20.

In step S51, the CPU 1 enters FEh into a variable i when the facsimile transmission was successfully completed. The FEh indicates that the facsimile transmission was successful, and is stored on the top of the transmission history information 71 of FIG. 19. In other words, finding the FEh on the top of the transmission history information indicates that the transmission was successful. Not finding the FEh on the top of the transmission history information indicates that an error occurred during the transmission, and a figure corresponding to the number of pages actually transmitted is shown. FEh is also stored on the top when no facsimile transmission is performed. In this case, no information is entered into the items 71 to 75.

In step S52, the transmission date (year/month/day) is entered into a variable Y.

In step 853, the company name of the sendee is input into a variable C. When no company name information is provided, nothing is entered into the variable C. In this case, when the transmission history is displayed, the item of the company name is blank.

In step S54, the name of the sendee is entered into a variable N.

In step S55, the heading portion of the transmitted data (character string) is entered into a variable J (In the case of FIG. 10, the registration name is entered).

In step S56, the CPU 1 shifts the transmission history information records backward in the transmission history memory region 33 so as to have a space for storing a new transmission history information record. For example, in FIG. 19, a portion $R_1$ for one transmission history information record is made vacant by shifting $R_{N-1} \rightarrow R_N$, $R_{N-2} \rightarrow R_{N-1}$, ..., $R_2 \rightarrow R_3$, $R_1 \rightarrow R_2$ (the smaller the subscripted number is the newer the entry).

In step S57, the newly transmitted history information (composed of i, Y, C, N, and J) is stored in the top portion $R_1$. Thus, the process of storing new transmission history information is completed.

If an error occurs during the facsimile transmission, the number of pages transmitted is entered into the variable i in step S58. Thereafter, above steps S52 through S57 are executed. With this arrangement, the transmission history can be stored in the RAM 3 when an error occurs during the facsimile transmission.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An electronic apparatus comprising:
    data memory means for storing input data;
    transmission means for facsimile-transmitting the data stored in the data memory means;
    history information memory means for storing history information of the transmission transmitted by the transmission means;
    listing display means for listing the history information stored in the history information memory means;
    specifying means for specifying desired history information from the history information listed by the listing display means; and
    retrieval means for retrieving the data corresponding to the history information specified by the specifying means from the data memory means to the listing display means, wherein the history information memory means stores a result of the transmission, a transmission date, a sendee, and a portion of the data transmitted as the history information of the transmission.

2. An electronic apparatus according to claim 1, wherein the retrieval means compares the portion of the data of the history information specified by the specifying means with the data stored in the data memory means, and retrieves data identical to the portion of the transmitted data from the data memory means to the display means.

3. A method, comprising the steps of:
    storing input data;
    transmitting, via facsimile, the stored input data;
    storing history information of the transmitted facsimile transmission;
    listing the stored history information;
    specifying desired history information from the listed history information; and
    retrieving stored data corresponding to the specified desired history information, wherein the stored history information includes a result of the transmission, a transmission date, a sendee, and a portion of the transmitted data.

4. The method of claim 3, wherein the step of retrieving includes the substeps of,
    comparing the portion of the data of the specified history information with stored data; and retrieving stored data identical to the portion of the specified history information.

5. An electronic apparatus comprising:

data memory means for storing input data;

transmission means for facsimile-transmitting the data stored in the data memory means;

history information memory means for storing a set of at least a portion of the transmission data and history information of the transmitted of the data for every transmitted facsimile transmission;

display means for listing the history information stored in the history information memory means in a manner that the relatively newer history information is relatively nearer to a top of the list; and selection means for selecting desired history information from the listed history information, wherein the display means lists at least a portion of the transmitted data corresponding to the selected history information and wherein the stored history information includes a result of the facsimile transmission, a transmission date, and a sendee of the data stored in the data memory means.

6. An electronic apparatus according to claim 5, wherein the history information listed by the display means includes a predetermined code when the facsimile transmission is successful, while it displays the amount of data transmitted to a sendee when the facsimile transmission is not successful.

7. An electronic apparatus according to claim 5, wherein the history information listed by the display means includes a display of a result of the facsimile transmission, a transmission date, and a sendee corresponding to the data stored in the data memory means in a row.

8. An electronic apparatus according to claim 5, wherein the selection means includes an upward key and a downward key for selecting the desired history information from the history information listed on the display means.

9. An electronic apparatus according to claim 5, wherein the display means highlights the selected history information.

10. A method comprising the steps of:

storing input data;

transmitting, via facsimile, the stored input data;

storing a set of at least a portion of the transmitted data and history information of the data transmission, for each transmitted facsimile transmission;

listing the stored history information such that relatively newer history information is relatively closer to a top of the list; and selecting desired history information from the listed history information, wherein at least a portion of the transmitted data corresponding to the selected history information is listed and wherein the stored history information includes a result of the facsimile transmission, a transmission date, and a sendee of the stored data.

11. The method of claim 10, wherein the listed history information includes a predetermined code when the facsimile transmission is successful and includes the amount of data transmitted to a sendee when the facsimile transmission is not successful.

12. The method of claim 10, wherein the listed history information includes a row of a result of the facsimile transmission, a transmission data, and a sendee corresponding to the stored data.

13. The method of claim 10, wherein the step of selecting includes the substep of selecting the desired history information from the listed history information utilizing one of an upward key and downward key.

14. The method of claim 10, further comprising the step of:

highlighting the selected desired history information.

* * * * *